April 28, 1942.  C. U. STOLTZFUS  2,281,212
MATERIAL SPREADER
Filed July 27, 1940  3 Sheets-Sheet 1
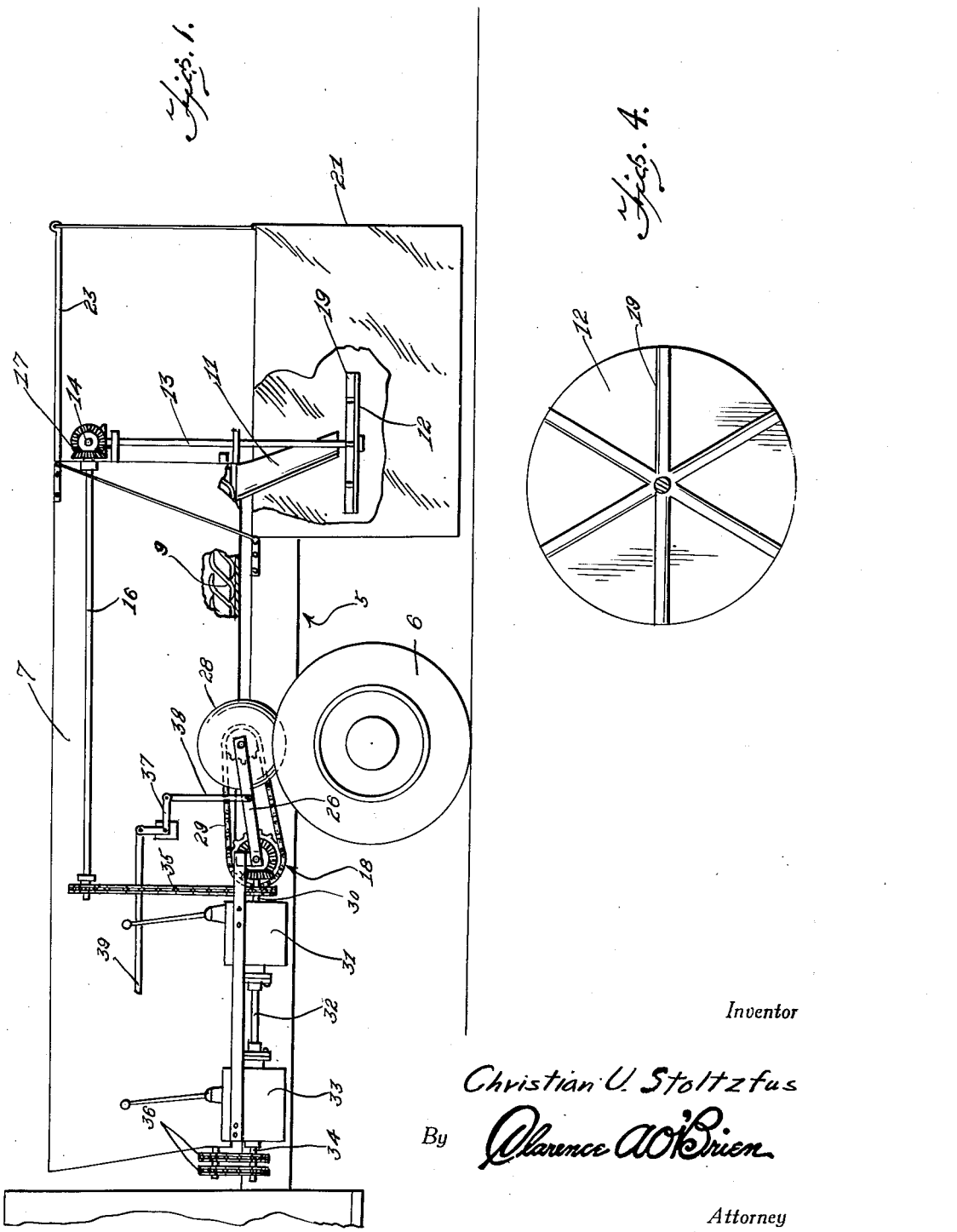
Inventor
Christian U. Stoltzfus
By Clarence A. O'Brien
Attorney

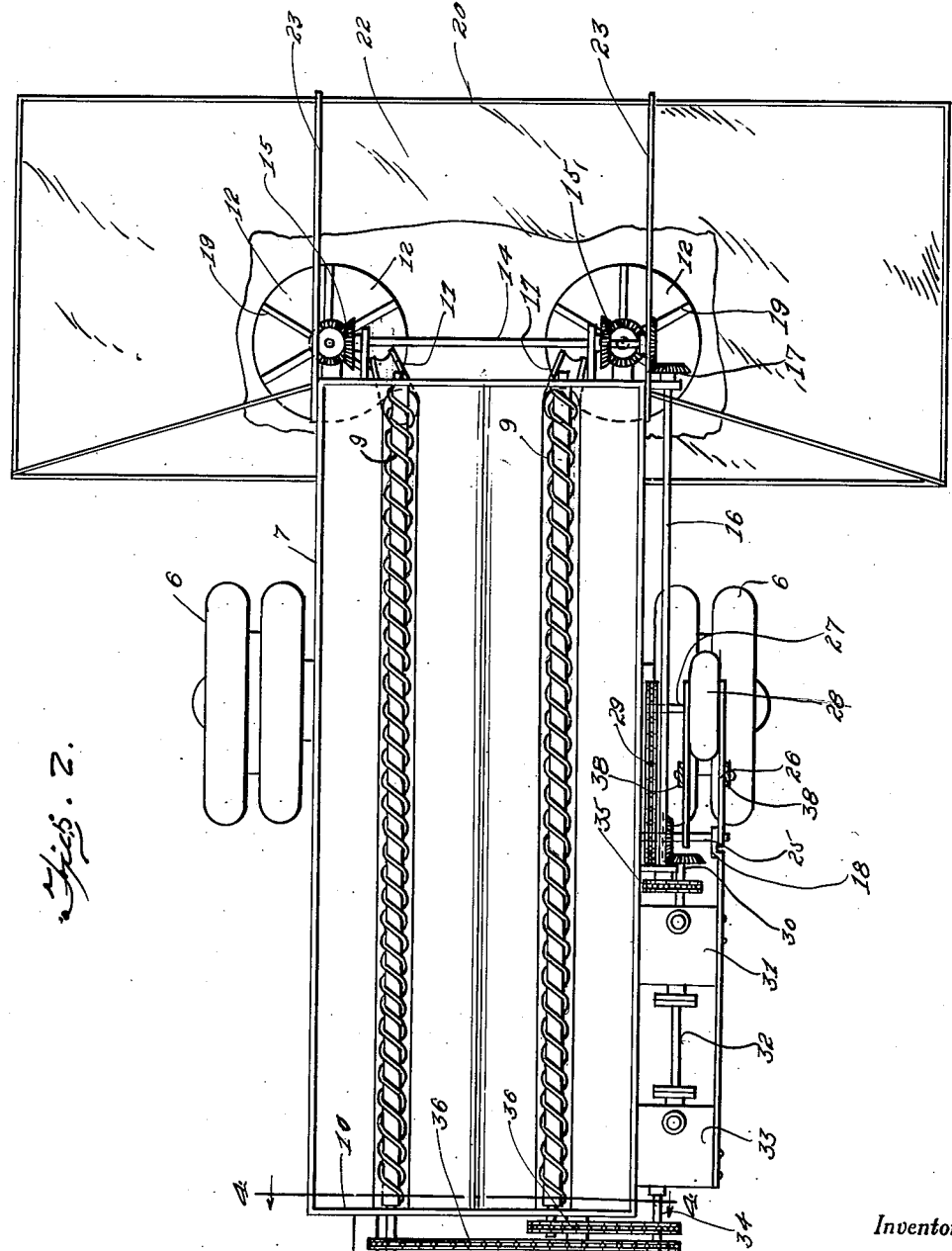

April 28, 1942. C. U. STOLTZFUS 2,281,212
MATERIAL SPREADER
Filed July 27, 1940 3 Sheets-Sheet 3
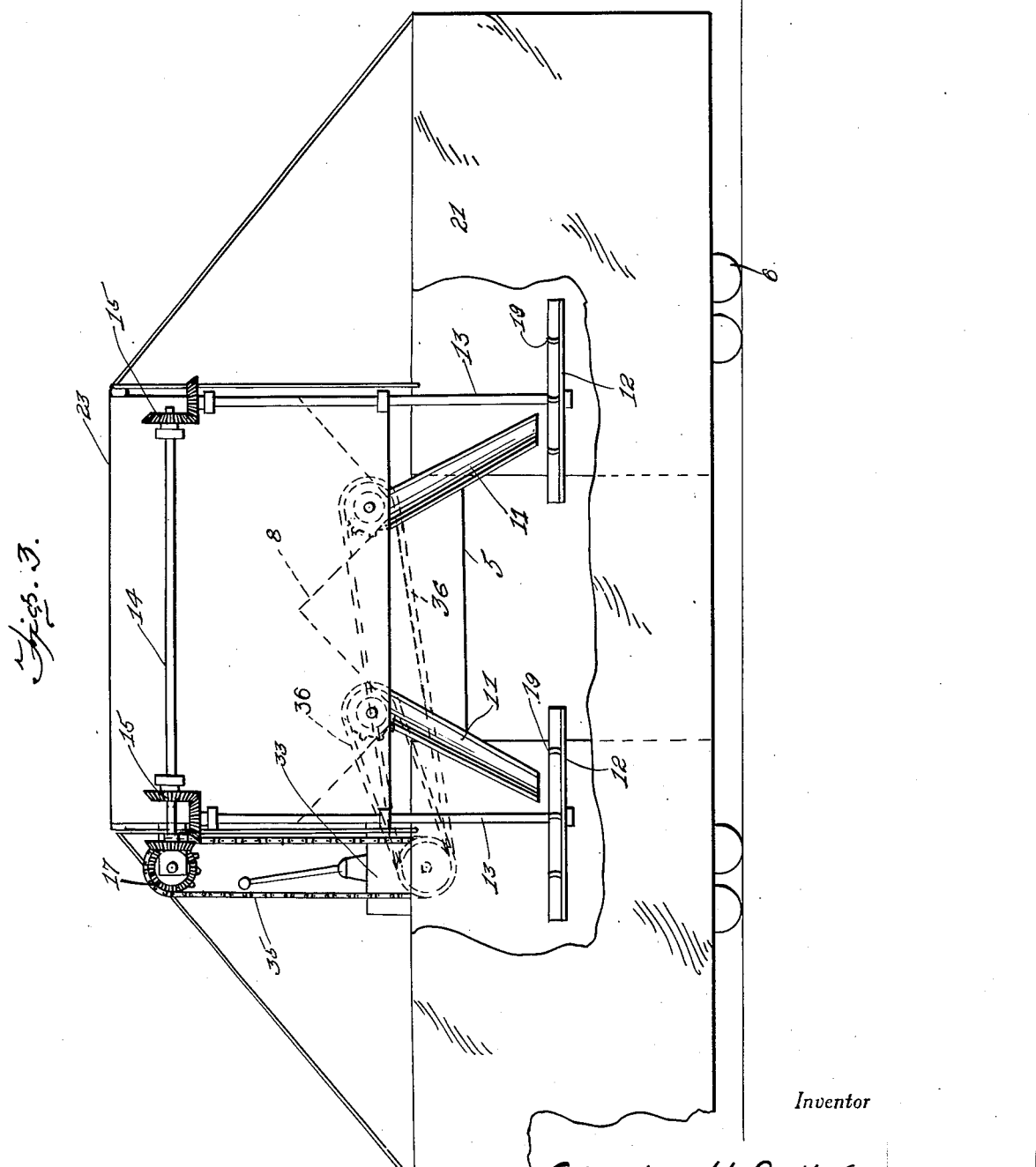
Inventor
Christian U. Stoltzfus
By Clarence A. O'Brien
Attorney Patented Apr. 28, 1942

2,281,212

UNITED STATES PATENT OFFICE 2,281,212

MATERIAL SPREADER

Christian U. Stoltzfus, Joanna, Pa.

Application July 27, 1940, Serial No. 348,042

1 Claim. (Cl. 275—8)

This invention relates to a material spreader especially adapted for agricultural purposes and has for the primary object the provision of a device of this character which may be readily mounted on a conventional type of motor vehicle to be carried thereby and to receive power therefrom for its operation of spreading uniformly over the ground materials, such as fertilizer in the form of lime, compost, etc. and is so constructed that its speed of deliverance of the material may be varied and also whereby wind or air currents will not unduly affect the uniform distribution of the material.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 1 is a side elevation, partly in section, illustrating a material spreader constructed in accordance with my invention and showing the same mounted on a conventional type of motor vehicle.

Figure 2 is a top plan view, partly broken away, illustrating the device.

Figure 3 is a rear elevation illustrating the device.

Figure 4 is a plan view, partly in section, illustrating one of the rotatable distributing discs.

Referring in detail to the drawings, the numeral 5 indicates a fragmentary portion of a conventional type of motor vehicle, the rear traction wheels being indicated by the character 6. This much of a motor vehicle is disclosed in the drawings for the purpose of clearly illustrating the application of the present invention on a vehicle of this type.

An open type body 7 is mounted on the frame of the motor vehicle and forms a hopper to receive material to be distributed and the bottom wall thereof is in the form of a pair of troughs 8 each of substantially V-shape in cross section and operating in said troughs are spiral type conveyors 9 suitably journaled in end walls 10 of the body and which deliver into downwardly extending troughs 11 mounted on the rear end of the body and terminate directly over rotatable distributing discs 12.

The discs 12 are secured to the lower ends of vertically arranged shafts 13 suitably journaled at the rear end of the body and said shafts are geared to a transversely arranged shaft 14, as shown at 15. A longitudinally extending shaft 16 is journaled on the body and is geared to the transversely arranged shaft 14, as shown at 17. The shaft 16 is driven by a power takeoff mechanism indicated in entirety by the character 18 and which will be hereinafter more fully described in detail.

The discs 12 have secured on the upper faces thereof radially extending fins or plates 19 to aid in the discharge of the material received from the troughs 11 over a given area of ground as the vehicle progresses thereover.

A frame 20 is mounted on the rear portion of the body and has secured thereto and depending therefrom curtains 21 in which the rotating discs operate. The purpose of the curtains is to protect the distribution of the material from the discs from air currents or wind so that the uniform distribution of the material will not be affected on a windy day. The frame 20 also carries a top wall 22 of fibrous material through which the shafts 13 and troughs 11 extend coacting with the curtains 21 in completing the enclosure in which the discs operate.

A superstructure 23 is secured on the body 7 and attached to the frame 20 to aid in supporting the latter at the rear end of the motor vehicle.

The power takeoff mechanism 18 includes a shaft 25 suitably journaled on the body 7 at one side thereof and has journaled thereon spaced arms 26 carrying an axle 27 to which is secured a wheel 28 adapted to be moved into engagement with a pair of traction wheels of the motor vehicle. If desired, the wheel 28 may be tired with a pneumatic tire.

The axle 27 is connected to the shaft 25 by sprocket gear mechanism 29.

The shaft 25 is geared to a shaft 30 forming a part of a variable speed transmission 31 of a conventional construction. The transmission 31 may be connected through a drive shaft 32 to a variable speed transmission 33 of a conventional construction. The power takeoff shaft of the transmission 33 is indicated by the character 34.

A sprocket chain mechanism 35 connects the shaft 30 to the shaft 16 and the power takeoff shaft 34 is connected to the conveyors 9 by sprocket chain mechanisms 36.

A bell crank lever 37 is pivotally mounted on one side of the body and is connected to one of the arms 26 by a link 38 and a suitable control device 39 is connected to the bell crank lever whereby the operator may engage and disengage the wheel 28 with the traction wheels of the vehicle.

Thus it will be seen from the foregoing description taken in connection with the drawings that the material placed in the body may be readily fed therefrom onto the rotating discs and the latter through centrifugal action will spread the material uniformly over a selected area of ground during the forward progress of the vehicle. Further, it will be seen that the conveyors and discs are driven by power derived from the traction wheels of the motor vehicle and that these parts can be driven at variable speeds through the manipulation of the transmissions 31 and 33.

While I have shown and described the preferred embodiment of my invention, it is to be understood that minor changes in construction, combination and arrangement of parts may be made without departing from the spirit and scope of the invention claimed.

Having thus described the invention, what I claim is:

In a material spreader, a vehicle having a body, means for conveying material to the rear of the body, horizontally arranged centrifugal spreading means at the rear of the body and located below the body, chutes for delivering the material from the conveying means on to said spreading means, an elongated horizontally arranged frame connected with the vehicle below the body and extending outwardly beyond the sides of the body and rearwardly beyond the rear end of the body, curtains suspended from the frame and terminating a limited distance from the ground to restrict spreading of the material beyond a given distance from the body, a flexible top connected with the frame and having openings therein for the passage of the chutes, said frame having vertically arranged portions engaged by parts of the curtains, a frame connected with the top of the rear portion of the body and extending beyond the same and suspension means connecting the last-mentioned frame with the curtain supporting frame.

CHRISTIAN U. STOLTZFUS.